US012792477B2

(12) United States Patent
Reddy et al.

(10) Patent No.: US 12,792,477 B2
(45) Date of Patent: Nov. 10, 2026

(54) CLUSTER WIDE REBUILD REDUCTION AGAINST STORAGE NODE FAILURES

(71) Applicant: Intel Corporation, Santa Clara, CA (US)

(72) Inventors: Anjaneya Reddy Chagam Reddy, Chandler, AZ (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 21 days.

(21) Appl. No.: 17/936,201

(22) Filed: Sep. 28, 2022

(65) Prior Publication Data

US 2023/0013798 A1 Jan. 19, 2023

(51) Int. Cl.
*G06F 11/20* (2006.01)

(52) U.S. Cl.
CPC ...... *G06F 11/2025* (2013.01); *G06F 11/2094* (2013.01); *G06F 2201/805* (2013.01)

(58) Field of Classification Search
CPC ............ G06F 11/2007; G06F 11/2025; G06F 11/2033; G06F 11/2035; G06F 11/2043; G06F 11/2094
See application file for complete search history.

(56) References Cited

U.S. PATENT DOCUMENTS 8,051,246 B1 * 11/2011 Caklovic ............ G06F 12/0866 711/170
9,864,663 B2 * 1/2018 Khemani ............ G06F 12/0893
2010/0138686 A1 * 6/2010 Arata ................ G06F 11/2046 714/E11.073
2021/0314390 A1 * 10/2021 Derome .............. H04L 67/1004
2022/0179804 A1 * 6/2022 Anchi ................ G06F 11/2094

FOREIGN PATENT DOCUMENTS

WO 20210232396 A1 11/2021

OTHER PUBLICATIONS

Compute Express Link (CXL) Specification, Revision 2.0, Oct. 2020 (Year: 2020).*
Prout, "Expanding Beyond Limits with CXL-based Memory", Samsung, Flash Memory Summit, Aug. 2, 2022 (Year: 2022).*
Gouk et al., "Practical Memory Disaggregation using Compute Express Link." The 3rd Workshop on Resource Disaggregation and Serverless Computing (WORDS'22), 2022. University of California, 2022. (Year: 2022).*
Agarwal, "CXL Overview and Evolution", Intel, Hot 34 Chips, CXL Consortium 2022 (Year: 2022).*

* cited by examiner

*Primary Examiner* — Michael Maskulinski
(74) *Attorney, Agent, or Firm* — Compass IP Law PC

(57) ABSTRACT

Systems, apparatuses and methods may provide for technology that detects a first failure in a first storage server, wherein the first storage server is connected to a first non-volatile memory (NVM) via a switch, selects a second storage server that is connected to the first NVM via the switch, wherein the first storage server and the second storage server are in a storage cluster, and configures the second storage server to host first data resident on the first NVM, wherein configuring the second storage server to host the first data bypasses a cluster-wide rebalance of the storage cluster.

16 Claims, 6 Drawing Sheets

CLUSTER WIDE REBUILD REDUCTION AGAINST STORAGE NODE FAILURES

TECHNICAL FIELD

Embodiments generally relate to storage devices. More particularly, embodiments relate to cluster-wide rebuild reduction against storage node failures.

BACKGROUND

Software Defined Storage (SDS) is a scale out shared nothing architecture (e.g., nodes do not share resources) that presents a single namespace by aggregating storage resources from servers in a cluster. SDS may provide elastic scalability and resilience against hardware failures by distributing multiple copies of data among fault domains. When a storage node fails in the cluster, SDS triggers a cluster-wide rebalance to ensure that surviving nodes maintain the same number of data copies or erasure coded data fragments to meet resiliency goals. It typically takes several hours to complete the rebalance activity, wherein the rebalance time is directly proportional to amount of capacity lost due to storage node failure. Moreover, during rebalancing activity, the cluster may be vulnerable to data loss if there are cascading failures.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Storage node capacity is typically maintained at low hundreds of Tera Bytes (TBs) in order to avoid long rebalance times and negative impacts to service level agreements (SLAs). Emerging workloads such as artificial intelligence (AI) workloads are driving significant data growth, which in turn creates a demand to increase storage node capacities to multi-Peta Byte (PB) capacities. The technology described herein provides an enhancement that minimizes or avoids cluster-wide rebalancing activity and therefore enables larger (e.g., multi-Peta Byte) storage capacities per server.

More particularly, embodiments involve disaggregating storage nodes coupled with storage software innovations to eliminate or minimize rebuild times due to server failures. Storage devices and memory are disaggregated from storage servers using low-latency, high-bandwidth interfaces such as CXL (Compute Express Link, e.g., CXL Specification, Rev. 3.0, Aug. 1, 2022, Compute Express Consortium) interfaces/switches, while storage software discovers memory, device and switch topologies. Placement advancements use this information to ensure that data is distributed among fault domains by comprehending disaggregated memory, storage and avoiding single points of failure. Storage software along with platform hot-plug functionality may also be used to boot strap storage devices from a failed server to a healthy server in the cluster. Conventional storage software boot strapping techniques may be modified to re-use resident CXL in-memory metadata, cache and start instantaneously.

In the case of a storage drive failure, a separate unordered virtual channel with PCIe (Peripheral Component Interconnect Express, e.g., PCI Express® Base Specification 6.0, Version 1.0, Jan. 11, 2022, PCI Special Interest Group) source ordering technology is used to stream writes via, for example, PCIe non-transport bridging (NTB) over network (e.g., remote direct memory access/RDMA). Such an approach provides faster replication on surviving storage devices in the cluster to rehydrate lost data.

Figure 1:
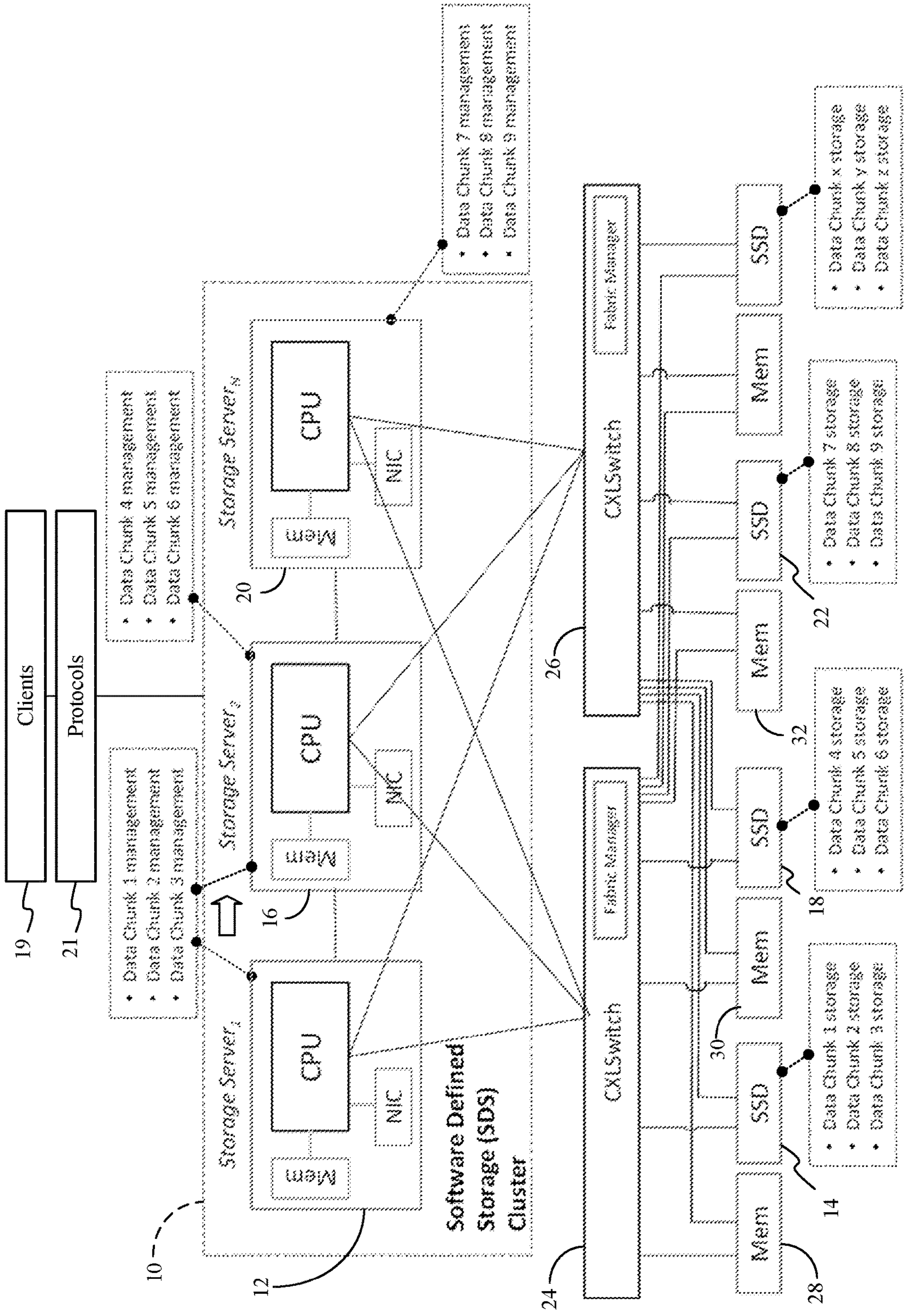
FIG. 1 is a block diagram of an example of a storage cluster according to an embodiment.

Turning now to FIG. 1, a storage cluster 10 is shown in which SDS software includes a cluster service and storage daemons (not shown) that work together to service access to clients (e.g., databases, AI frameworks, virtual machines) 19 using storage protocols 21 (e.g., block, object, file). In an embodiment, the clients 19 have no visibility into where and how data is stored in the storage cluster 10. In one example, the cluster service is responsible for maintaining storage node topologies (e.g., rack, server)) and monitoring storage node health. Additionally, the storage daemons may be responsible for managing media and providing read/write data access to requests from the clients 19. In an embodiment, client data is sharded into data chunks and spread across the storage cluster 10 to ensure smooth access patterns among all nodes (i.e., avoid hot spots) in the cluster 10.

More particularly, a first storage server 12 manages/hosts data chunks (e.g., Chunks 1-3) that are resident/stored on a first solid state drive (SSD, e.g., non-volatile memory) 14, a second storage server 16 manages/hosts data chunks (e.g., Chunks 4-6) that are resident/stored on a second SSD 18, and an $n^{th}$ storage server 20 manages/hosts data chunks (e.g., Chunks 7-9) that are resident/stored on a third SSD 22. Rather than co-locating the SSDs 14, 18, 22 with the storage servers 12, 16, 20, respectively, the storage servers 12, 16, 20 are connected to the SSDs 14, 18, 22 via a first switch 24 and a second switch 26. In one example, the switches 24, 26 are low-latency, high-bandwidth interfaces such as CXL interfaces.

Thus, a storage daemon running inside the first storage server 12 may use a CXL memory buffer (not shown) attached to the switches 24, 26 to hold storage metadata, wherein the storage metadata includes details on how to map Chunks 1-3 to physical block sectors inside the first SSD 14. Similarly, the second storage server 16 may use a CXL memory buffer (not shown) attached to the switches 24, 26 to hold storage metadata that includes details on how to map Chunks 4-6 to physical block sectors inside the second SSD 18.

If a failure is detected in, for example, the first storage server 12, other servers in the cluster 10 such as, for example, the second storage server 16 may be automatically selected (e.g., based on topology data, one or more hash criteria, etc.) and configured (e.g., via hot-plug flow, storage daemon service, metadata, etc.) to host some or all of the data that is resident on the first SSD 14. Such an approach enables a cluster-wide rebalance of the storage cluster 10 to be bypassed/avoided.

The illustrated architecture may also include a first volatile memory 28 (e.g., dynamic random access memory/DRAM) associated with the first SSD 14, a second volatile memory 30 associated with the second SSD 18, a third volatile memory 32 associated with the third SSD 22, and so forth. In such a case, the storage servers 12, 16, 20 may also be connected to the volatile memories 28, 30, 32 via the switches 24, 26. Accordingly, the second storage server 16 may be configured to host some or all of data resident on the first volatile memory 28 in response to a failure in the first storage server 12 and without triggering a cluster-wide rebalance of the storage cluster 10.

In one example, each of the switches 24, 26 includes a fabric manager to build a cluster-wide topology, as will be discussed in greater detail. Additionally, each of the SSDs 14, 18, 22 and the volatile memories 28, 30, 32 may be connected to multiple switches 24, 26 to protect against failures in the switches 24, 26 themselves. The illustrated storage servers 12, 16, 20 also include memory (e.g., storing instructions to manage failures, support non-storage related input/output (IO) processing, etc.), central processing units (CPUs, e.g., host processors to execute the instructions in memory), and network interface cards (NICs, e.g., wired/wireless).

The illustrated architecture therefore to ensures that surviving nodes maintain the same number of data copies to meet resiliency goals while avoiding the several hours that it typically takes to complete the rebalance activity. Moreover, the storage cluster 10 is less vulnerable to data loss if there are cascading failures.

Figure 2:
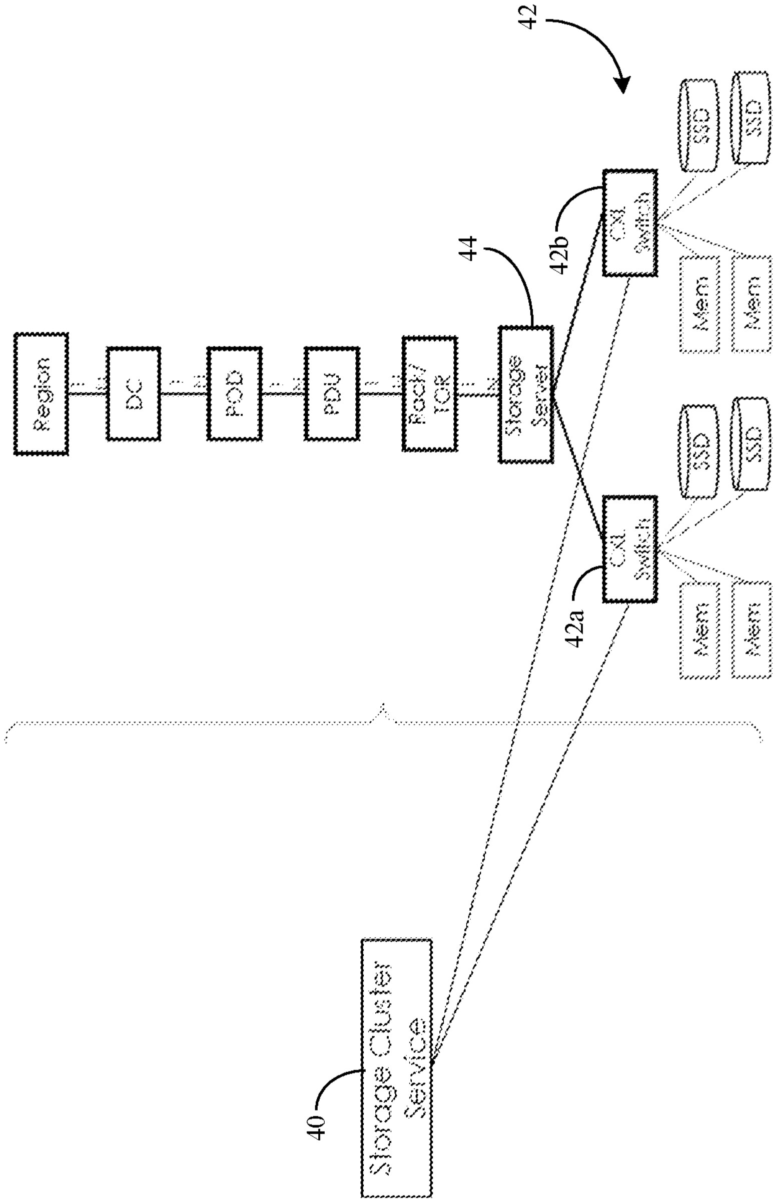
FIG. 2 is a block diagram of an example of a cluster topology according to an embodiment.

FIG. 2 shows a storage cluster service 40 that discovers topologies of switches 42 (42*a*-42*b*) via fabric managers on the switches 42 and builds a datacenter (DC) topology based on topology data (e.g., region, datacenter, pod, power distribution unit/PDU, rack, top of rack/TOR, etc.) associated with a storage server 44 coupled to the switches 42. This information forms the basis for placement technology to distribute data among different switch fault domains and ensure that multiple copies of data do not co-exist on the same switch 42. The storage cluster service 40 may execute on one or more suitable processors (e.g., CPUs) in a storage cluster such as the storage cluster 10 (FIG. 1), already discussed.

Figure 3:
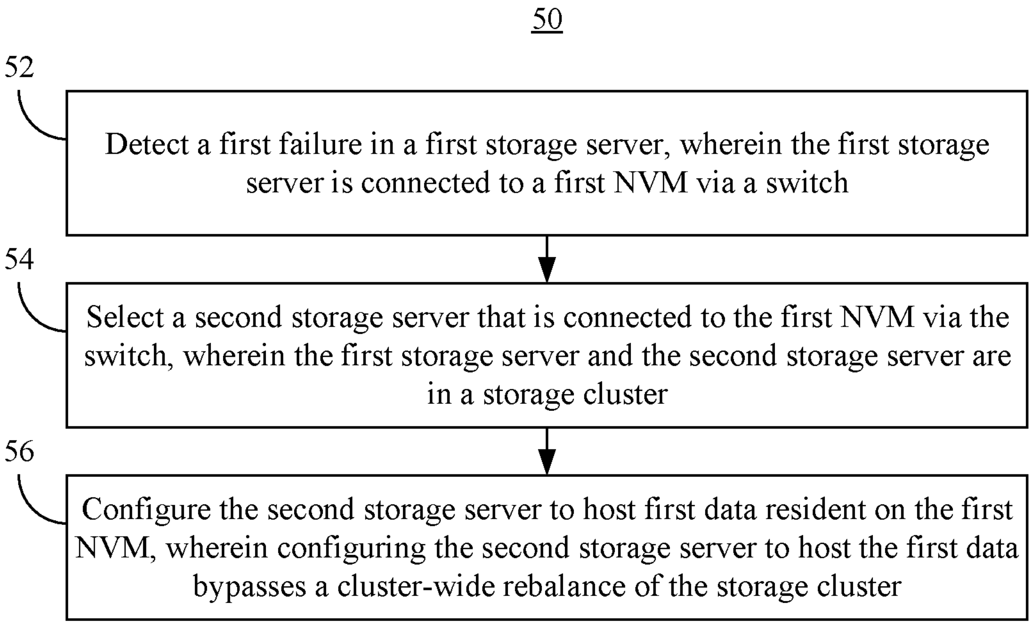
FIG. 3 is a flowchart of an example of a method of managing server failures in a storage cluster according to an embodiment.

FIG. 3 shows a method 50 of managing server failures. The method 50 may generally be implemented in a processor such as, for example, one or more of the CPUs in the storage cluster 10 (FIG. 1), already discussed. More particularly, the method 50 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic (e.g., configurable hardware), fixed-functionality logic (e.g., fixed-functionality hardware), or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Illustrated processing block 52 provides for detecting a first failure (e.g., CPU failure) in a first storage server, wherein the first storage server is connected to a first NVM (e.g., SSD) via a switch (e.g., CXL switch). Block 54 selects a second storage server that is connected to the first NVM via the switch, wherein the first storage server and the second storage server are in (e.g., part of) a shared storage cluster such as the storage cluster 10 (FIG. 1), already discussed. In an embodiment, block 54 selects the second storage server based on topology data (e.g., region, datacenter, pod, PDU, rack, TOR, etc.) associated with the storage cluster and one or more hash criteria (e.g., to ensure appropriate data distribution and/or smoothness of access). Block 56 configures the second storage server to host first data resident on the first NVM, wherein configuring the second storage server to host the first data bypasses a cluster-wide rebalance of the storage cluster. In one example, block 56 conducts a hot-plug flow with respect to the first NVM and the second storage server, initiates a storage daemon service, and reads metadata from the switch.

In some architectures, the first storage server and the second storage server are also connected to a volatile memory (e.g., DRAM) via the switch. In such a case, block 56 may also configure the second storage server to host second data resident on the volatile memory in response to the first failure in the first storage server. While some examples may reference two storage servers, the examples may be readily expanded to N servers. The method 50 therefore enhances performance at least to the extent that using the switch to configure another storage server to host the first and/or second data ensures that surviving nodes maintain the same number of data copies to meet resiliency goals while avoiding the several hours that it typically takes to complete the rebalance activity. Moreover, bypassing the cluster-wide rebalance enables the storage cluster to be less vulnerable to data loss if there are cascading failures.

Figure 4:
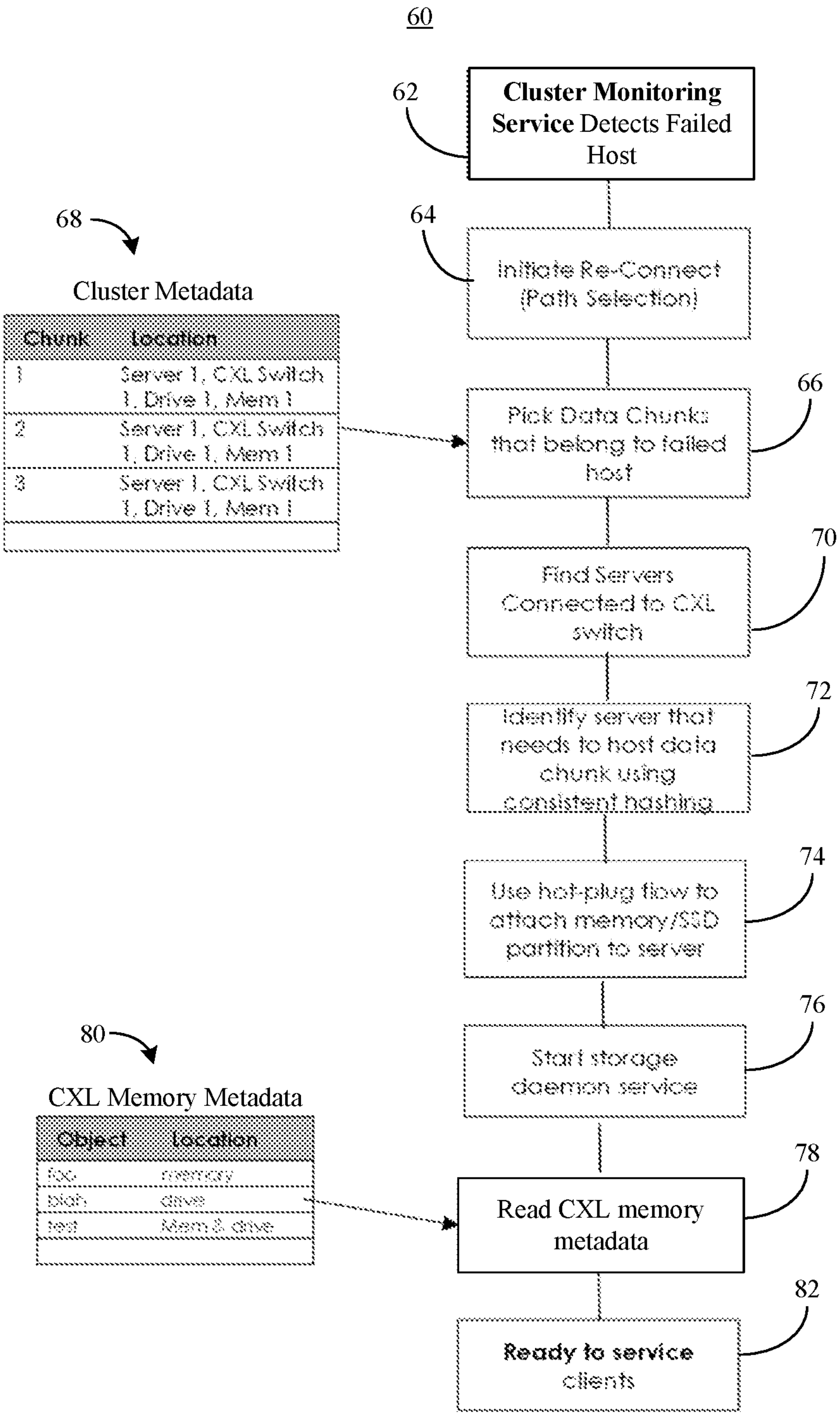
FIG. 4 is a flowchart of an example of a more detailed method of managing server failures in a storage cluster according to an embodiment.

FIG. 4 shows a more detailed method 60 of managing storage server failures in a storage cluster. The method 60 may generally be implemented in a processor such as, for example, one or more of the CPUs in the storage cluster 10 (FIG. 1), already discussed. More particularly, the method 60 may be implemented in one or more modules as a set of logic instructions stored in a machine- or computer-readable storage medium such as RAM, ROM, PROM, firmware, flash memory, etc., in hardware, or any combination thereof.

Illustrated processing block 62 detects a failed host, wherein block 64 initiates a re-connection (e.g., path selection) in response to the host failure. In an embodiment, block 66 uses cluster metadata 68 to select data chunks that belong to the failed host. Additionally, block 70 may locate/find servers that share a CXL switch with the failed host. In one example, block 72 identifies an appropriate server to host the affected data chunks using consistent hashing (e.g., one or more levels of indirection to achieve reachability, availability and load balancing objectives). Block 74 uses a hot-plug flow to attach a memory and/or SSD partition to the selected server (e.g., enumeration without reboot). In an embodiment, block 76 starts a storage daemon service, wherein block 78 reads CXL memory metadata 80. Block 82 may then announce that the selected server is ready to service clients.

Therefore, the cluster monitoring service detects server failures and initiates a re-connection operation. Moreover, the cluster metadata 68 includes ownership of data chunks, wherein the cluster metadata 68 is used to identify list of data chunks to be hosted on surviving nodes in the storage cluster. In order to avoid rebalancing, the cluster service selects only storage servers that have access to storage and memory of the failed storage service. This approach is in stark contrast to traditional SDS implementations, which start moving data over the network for rebalancing operations. In the disaggregated mode implementation, there is no data movement when a storage server fails. The solution becomes a simple mounting operation for storage media and CXL memory onto one of the surviving servers attached to CXL switch. Moreover, since CXL memory is in-tact (e.g., unlike traditional implementations), there is no need to rebuild in-memory metadata or cached data. In an embodiment, storage software manages CXL memory exclusively using custom memory allocators to organize memory, which may include direct access memory (dax) extensions and kernel managed memory. In one example, the CXL memory is organized in a tree hierarchy to locate all metadata buffers inside the memory. This approach enables near real-time fast failover as there is no reading of drive contents to rebuild the metadata. Additionally, any cached data from clients will still be in-tact and rehydrating the cache again (e.g., attaching event handlers) is avoided.

Figure 5:
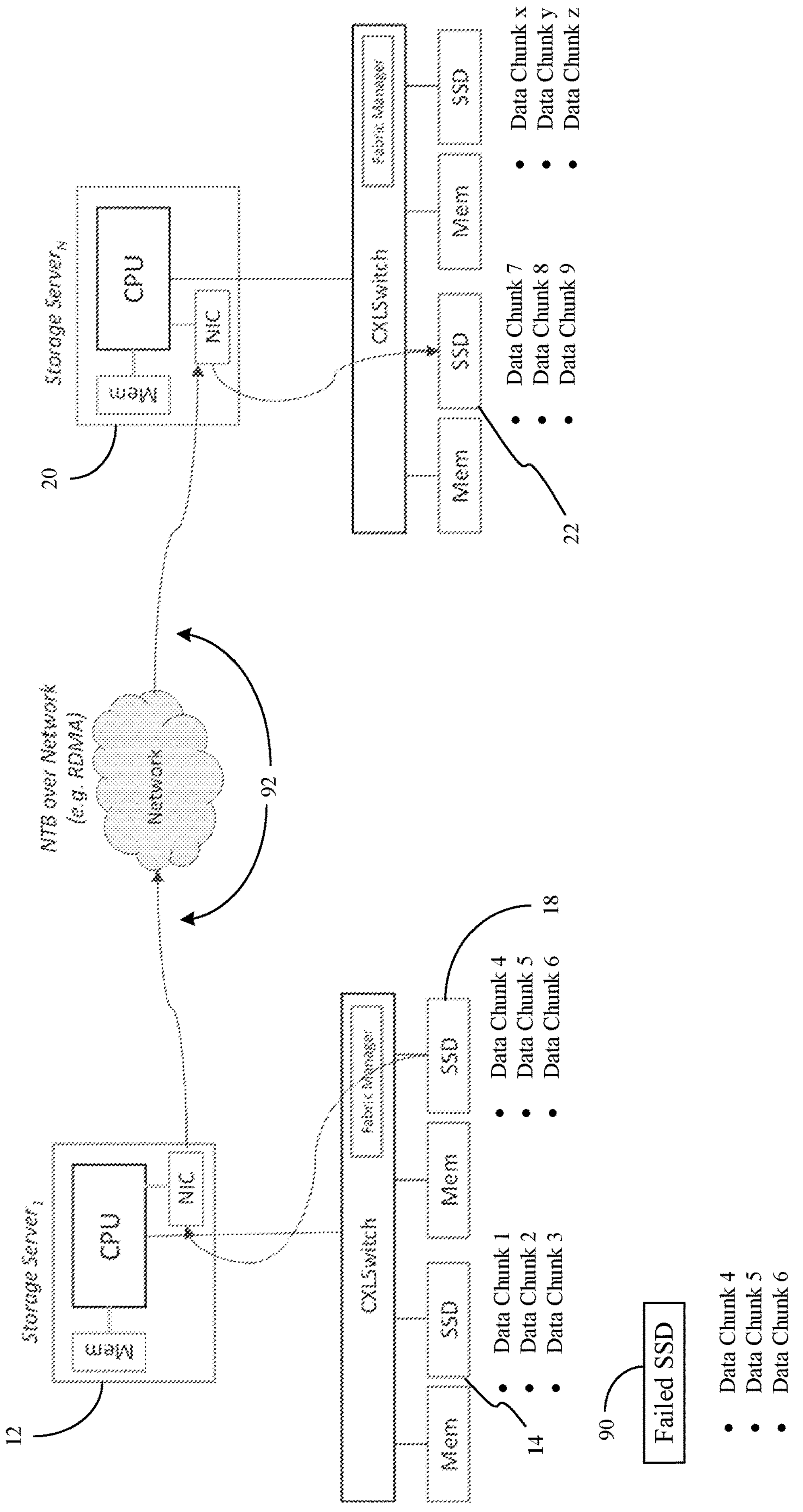
FIG. 5 is an illustration of an example of a source-ordered virtual channel according to an embodiment.

Turning now to FIG. 5, a scenario is shown in which a failed SSD 90 is detected, wherein the failed SSD 90 includes a redundant copy of data resident on, for example, the second SSD 18 (e.g., Data Chunks 4-6). In such a case, a source-ordered virtual channel 92 is established between the second SSD 18 and, for example, the third SSD 22 and the data is copied from the second SSD 18 to the third SSD 22 over the source-ordered virtual channel 92 via one or more unordered stream writes. Thus, replication is offloaded using unordered PCI streamed writes over network and PCIe Non Transparent Bridging (NTB). Additionally, the separate virtual channel 92 is used to provide predictable quality of service (QoS) during replication. In such a case, the second SSD 18 is responsible for source ordering. Traditional NVM Express (NVMe) SSDs that do not have unordered streamed write support may use peer-to-peer (P2P) DMA capability controlled by software.

Figure 6:
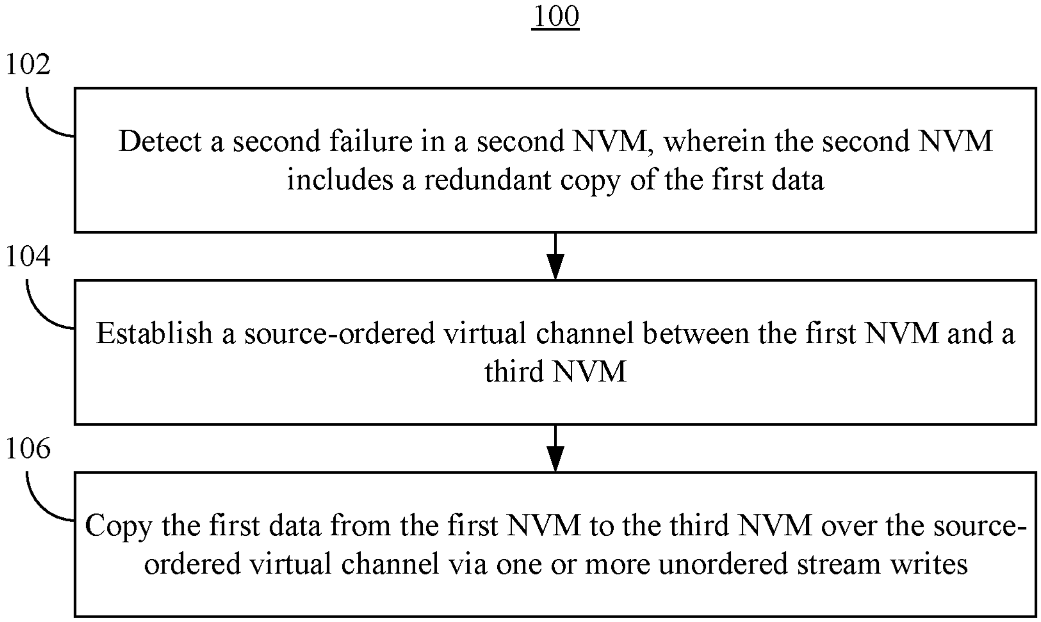
FIG. 6 is a flowchart of an example of a method of managing storage device failures according to an embodiment.

FIG. 6 shows a method 100 of managing storage device failures. The method 100 may generally be implemented in a processor such as, for example, one or more of the CPUs in the storage cluster 10 (FIG. 1) and/or the storage servers 12, 20 (FIG. 5), already discussed. More particularly, the method 100 may be implemented in one or more modules as a set of logic instructions stored in a machine- or computer-readable storage medium such as RAM, ROM, PROM, firmware, flash memory, etc., in hardware, or any combination thereof.

Illustrated processing block 102 provides for detecting a second failure in a second NVM, wherein the second NVM includes a redundant copy of the first data resident on the first NVM. Block 104 establishes a source-ordered virtual channel between the first NVM and a third NVM, wherein block 106 copies the first data from the first NVM to the third NVM over the source-ordered virtual channel via one or more unordered stream writes.

Figure 7:
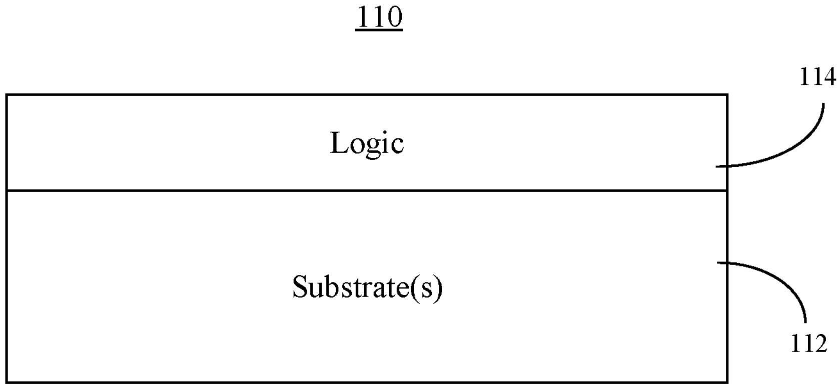
FIG. 7 is an illustration of an example of a semiconductor package according to an embodiment.

FIG. 7 shows a semiconductor apparatus 110 (e.g., chip, die) that includes one or more substrates 112 (e.g., silicon, sapphire, gallium arsenide) and logic 114 (e.g., transistor array and other integrated circuit/IC components) coupled to the substrate(s) 112. The logic 114, which may be implemented at least partly in configurable and/or fixed-functionality hardware, may generally implement one or more aspects of the method 50 (FIG. 3), the method 60 (FIG. 4) and/or the method 100 (FIG. 6), already discussed. Thus, the logic 114 may detect a first failure in a first storage server, wherein the first storage server is connected to a first NVM via a switch select a second storage server that is connected to the first NVM via the switch, wherein the first storage server and the second storage server are in a storage cluster, and configure the second storage server to host first data resident on the first NVM, wherein configuring the second storage server to host the first data bypasses a cluster-wide rebalance of the storage cluster.

In one example, the logic 114 includes transistor channel regions that are positioned (e.g., embedded) within the substrate(s) 112. Thus, the interface between the logic 114 and the substrate(s) 112 may not be an abrupt junction. The logic 114 may also be considered to include an epitaxial layer that is grown on an initial wafer of the substrate(s) 112.

ADDITIONAL NOTES AND EXAMPLES

Example 1 includes a performance-enhanced computing system comprising a storage cluster including a plurality of storage servers, a plurality of switches coupled to the storage cluster, a plurality of non-volatile memories (NVMs) coupled to the plurality of switches, a processor, and a cluster service memory coupled to the processor, the cluster service memory including a set of instructions, which when executed by the processor, cause the processor to detect a first failure in a first storage server of the plurality of servers, wherein the first storage server is connected to a first NVM in the plurality of NVMs via the switch, select a second storage server of the plurality of servers, wherein the second storage server is connected to the first NVM via the switch, and configure the second storage server to host first data resident on the first NVM, wherein configuring the second storage server to host the first data bypasses a cluster-wide rebalance of the storage cluster.

Example 2 includes the computing system of Example 1, wherein the second storage server is selected based on topology data associated with the storage cluster and one or more hash criteria.

Example 3 includes the computing system of Example 1, wherein to configure the second storage server to host the first data, the instructions, when executed, further cause the processor to conduct a hot-plug flow with respect to the first NVM and the second storage server, initiate a storage daemon service, and read metadata from the switch.

Example 4 includes the computing system of Example 1, further including a volatile memory connected to the first storage server and the second storage server via the switch, wherein the instructions, when executed, further cause the processor to configure the second storage server to host second data resident on the volatile memory in response to the first failure in the first storage server.

Example 5 includes the computing system of any one of Examples 1 to 4, wherein the instructions, when executed, further cause the processor to detect a second failure in a second NVM, wherein the second NVM includes a redundant copy of the first data, establish a source-ordered virtual channel between the first NVM and a third NVM, and copy the first data from the first NVM to the third NVM over the source-ordered virtual channel via one or more unordered stream writes.

Example 6 includes at least one computer readable storage medium comprising a set of instructions, which when executed by a computing system, cause the computing system to detect a first failure in a first storage server, wherein the first storage server is connected to a first non-volatile memory (NVM) via a switch, select a second storage server that is connected to the first NVM via the switch, wherein the first storage server and the second storage server are in a storage cluster, and configure the second storage server to host first data resident on the first NVM, wherein configuring the second storage server to host the first data bypasses a cluster-wide rebalance of the storage cluster.

Example 7 includes the at least one computer readable storage medium of Example 6, wherein the second storage server is selected based on topology data associated with the storage cluster and one or more hash criteria.

Example 8 includes the at least one computer readable storage medium of Example 6, wherein to configure the second storage server to host the first data, the instructions, when executed, further cause the computing system to conduct a hot-plug flow with respect to the first NVM and the second storage server, initiate a storage daemon service, and read metadata from the switch.

Example 9 includes the at least one computer readable storage medium of Example 6, wherein the first storage server and the second storage server are connected to a volatile memory via the switch, and wherein the instructions, when executed, further cause the computing system to configure the second storage server to host second data resident on the volatile memory in response to the first failure in the first storage server.

Example 10 includes the at least one computer readable storage medium of any one of Examples 6 to 9, wherein the instructions, when executed, further cause the computing system to detect a second failure in a second NVM, wherein the second NVM includes a redundant copy of the first data, establish a source-ordered virtual channel between the first NVM and a third NVM, and copy the first data from the first NVM to the third NVM over the source-ordered virtual channel via one or more unordered stream writes.

Example 11 includes a semiconductor apparatus comprising one or more substrates, and logic coupled to the one or more substrates, wherein the logic is implemented at least partly in one or more of configurable or fixed-functionality hardware, the logic to detect a first failure in a first storage server, wherein the first storage server is connected to a first non-volatile memory (NVM) via a switch, select a second storage server that is connected to the first NVM via the switch, wherein the first storage server and the second storage server are in a storage cluster, and configure the second storage server to host first data resident on the first NVM, wherein configuring the second storage server to host the first data bypasses a cluster-wide rebalance of the storage cluster.

Example 12 includes the semiconductor apparatus of Example 11, wherein the second storage server is selected based on topology data associated with the storage cluster and one or more hash criteria.

Example 13 includes the semiconductor apparatus of Example 11, wherein to configure the second storage server to host the first data, the logic is further to conduct a hot-plug flow with respect to the first NVM and the second storage server, initiate a storage daemon service, and read metadata from the switch.

Example 14 includes the semiconductor apparatus of Example 11, wherein the first storage server and the second storage server are connected to a volatile memory via the switch, and wherein the logic is to configure the second storage server to host second data resident on the volatile memory in response to the first failure in the first storage server.

Example 15 includes the semiconductor apparatus of any one of Examples 11 to 14, wherein the logic is further to detect a second failure in a second NVM, wherein the second NVM includes a redundant copy of the first data, establish a source-ordered virtual channel between the first NVM and a third NVM, and copy the first data from the first NVM to the third NVM over the source-ordered virtual channel via one or more unordered stream writes.

Example 16 includes a method of operating a performance-enhanced computing system, the method comprising detecting a first failure in a first storage server, wherein the first storage server is connected to a first non-volatile memory (NVM) via a switch, selecting a second storage server that is connected to the first NVM via the switch, wherein the first storage server and the second storage server are in a storage cluster, and configuring the second storage server to host first data resident on the first NVM, wherein configuring the second storage server to host the first data bypasses a cluster-wide rebalance of the storage cluster.

Example 17 includes the method of Example 16, wherein the second storage server is selected based on topology data associated with the storage cluster and one or more hash criteria.

Example 18 includes the method of Example 16, wherein configuring the second storage server to host the first data includes conducting a hot-plug flow with respect to the first NVM and the second storage server, initiating a storage daemon service, and reading metadata from the switch.

Example 19 includes the method of Example 16, wherein the first storage server and the second storage server are connected to a volatile memory via the switch, the method further including configuring the second storage server to host second data resident on the volatile memory in response to the first failure in the first storage server.

Example 20 includes the method of any one of Examples 16 to 19, further including detecting a second failure in a second NVM, wherein the second NVM includes a redundant copy of the first data, establishing a source-ordered virtual channel between the first NVM and a third NVM, and copying the first data from the first NVM to the third NVM over the source-ordered virtual channel via one or more unordered stream writes.

Example 21 includes an apparatus comprising means for performing the method of any one of Examples 16 to 20.

Thus, unlike traditional shared nothing implementations, server failures (e.g., processor, host memory, network and/or motherboard failures) will not trigger cluster-wide rebalancing under the technology described herein. Storage software with disaggregated processes can fail over instantaneously once the cluster monitoring detects that the node failure and CXL memory failures will not trigger cluster-wide rebalancing. Instead, storage software may reinitialize from pooled CXL memory. This approach is similar to server hot-plug flow for memory without needing to initialize from scratch. Additionally, storage rebalancing due to storage device failure may trigger non-cluster-wide rebalance activity. Due to low level replication using NTB over network (e.g., RDMA) and unordered streamed writes, this approach greatly reduces the amount of time needed to rebalance the failed drive data in the cluster.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A storage system comprising:
- a storage cluster including a plurality of storage servers and a processor to execute a cluster service;
- a plurality of compute express link (CXL) switches coupled to the storage cluster; and
- a plurality of non-volatile memories (NVMs) coupled to the plurality of CXL switches;
- wherein execution of the cluster service causes the processor to:
- detect a first failure in a first storage server of the plurality of storage servers, wherein the first storage server is connected to a first NVM in the plurality of NVMs via a selected CXL switch of the plurality of CXL switches,
- select a second storage server of the plurality of storage servers also connected to the first NVM via the selected CXL switch, wherein the second storage server is selected based on topology data associated with the storage cluster and one or more hash criteria, and
- configure the second storage server to host first data resident on the first NVM, wherein configuring the second storage server to host the first data bypasses a cluster-wide rebalance of the storage cluster.

2. The storage system of claim 1, wherein to configure the second storage server to host the first data comprises:
- conduct a hot-plug flow with respect to the first NVM and the second storage server,
- initiate a storage daemon service, and
- read metadata from the selected CXL switch.

3. The storage system of claim 1, further including a volatile memory connected to the first storage server and the second storage server via the selected CXL switch, wherein the processor is to configure the second storage server to host second data resident on the volatile memory in response to the first failure in the first storage server.

4. The storage system of claim 1, further comprising the processor to:
- detect a second failure in a second NVM of the plurality of NVMs, wherein the second NVM includes a redundant copy of the first data,
- establish a source-ordered virtual channel between the first NVM and a third NVM; and
- copy the first data from the first NVM to the third NVM over the source-ordered virtual channel via one or more unordered stream writes.

5. A non-transitory computer readable storage medium having instructions stored thereon, which when executed by a computing system, cause the computing system to:
- detect a first failure in a first storage server of a storage cluster including a plurality of storage servers, wherein the first storage server is connected to a first non-volatile memory (NVM) via a selected compute express link (CXL) switch of a plurality of CXL switches coupled to a plurality of NVMs;
- select, from the plurality of storage servers, a second storage server that is connected to the first NVM via the selected CXL switch, wherein the second storage server is selected based on topology data associated with the storage cluster and one or more hash criteria; and
- configure the second storage server to host first data resident on the first NVM, wherein configuring the second storage server to host the first data bypasses a cluster-wide rebalance of the storage cluster.

6. The non-transitory computer readable storage medium of claim 5, wherein to configure the second storage server to host the first data, the instructions, when executed, further cause the computing system to:

conduct a hot-plug flow with respect to the first NVM and the second storage server;

initiate a storage daemon service; and read metadata from the selected CXL switch.

7. The non-transitory computer readable storage medium of claim 5, wherein the first storage server and the second storage server are connected to a volatile memory via the selected CXL switch, and wherein the instructions, when executed, further cause the computing system to configure the second storage server to host second data resident on the volatile memory in response to the first failure in the first storage server.

8. The non-transitory computer readable storage medium of claim 5, wherein the instructions, when executed, further cause the computing system to:

detect a second failure in a second NVM, wherein the second NVM includes a redundant copy of the first data;

establish a source-ordered virtual channel between the first NVM and a third NVM; and copy the first data from the first NVM to the third NVM over the source-ordered virtual channel via one or more unordered stream writes.

9. A semiconductor apparatus comprising:

a communication connection to a storage cluster including a first storage server and a second storage server; and a processor to execute a cluster service to:

detect a first failure in a first storage server, wherein the first storage server is connected to a first non-volatile memory (NVM) via a selected compute express link (CXL) switch of a plurality of CXL switches coupled to a plurality of NVMs;

select a second storage server that is connected to the first NVM via the selected CXL switch, wherein the second storage server is selected based on topology data associated with the storage cluster and one or more hash criteria; and configure the second storage server to host first data resident on the first NVM, wherein configuring the second storage server to host the first data bypasses a cluster-wide rebalance of the storage cluster.

10. The semiconductor apparatus of claim 9, wherein to configure the second storage server to host the first data, the processor is to:

conduct a hot-plug flow with respect to the first NVM and the second storage server;

initiate a storage daemon service; and read metadata from the selected CXL switch.

11. The semiconductor apparatus of claim 9, wherein the first storage server and the second storage server are connected to a volatile memory via the selected CXL switch, and wherein the processor is to configure the second storage server to host second data resident on the volatile memory in response to the first failure in the first storage server.

12. The semiconductor apparatus of claim 9, wherein the processor is further to:

detect a second failure in a second NVM, wherein the second NVM includes a redundant copy of the first data;

establish a source-ordered virtual channel between the first NVM and a third NVM; and copy the first data from the first NVM to the third NVM over the source-ordered virtual channel via one or more unordered stream writes.

13. A method comprising:

detecting a first failure in a first storage server of a storage cluster including a plurality of storage servers, wherein the first storage server is connected to a first non-volatile memory (NVM) via a selected compute express link (CXL) switch of a plurality of CXL switches coupled to a plurality of NVMs;

selecting, from the plurality of storage servers, a second storage server that is connected to the first NVM via the selected CXL switch, wherein the second storage server is selected based on topology data associated with the storage cluster and one or more hash criteria; and configuring the second storage server to host first data resident on the first NVM, wherein configuring the second storage server to host the first data bypasses a cluster-wide rebalance of the storage cluster.

14. The method of claim 13, wherein configuring the second storage server to host the first data includes:

conducting a hot-plug flow with respect to the first NVM and the second storage server;

initiating a storage daemon service; and reading metadata from the selected CXL switch.

15. The method of claim 13, wherein the first storage server and the second storage server are connected to a volatile memory via the selected CXL switch, the method further including configuring the second storage server to host second data resident on the volatile memory in response to the first failure in the first storage server.

16. The method of claim 13, further including:

detecting a second failure in a second NVM, wherein the second NVM includes a redundant copy of the first data;

establishing a source-ordered virtual channel between the first NVM and a third NVM; and copying the first data from the first NVM to the third NVM over the source-ordered virtual channel via one or more unordered stream writes.

* * * * *